United States Patent [19]

Conley

[11] 4,420,502

[45] Dec. 13, 1983

[54] APPARATUS AND METHOD FOR PRODUCING A FLEXIBLE SHEET MATERIAL HAVING A PREDETERMINED SURFACE CHARACTERISTIC

[76] Inventor: Kenneth E. Conley, 3308 Mikelynn La., Matthews, N.C. 28105

[21] Appl. No.: 359,291

[22] Filed: Mar. 18, 1982

Related U.S. Application Data

[63] Continuation of Ser. No. 184,286, Sep. 5, 1980, abandoned.

[51] Int. Cl.³ .............................................. B05D 3/06
[52] U.S. Cl. .................................. 427/54.1; 156/245; 427/362
[58] Field of Search ........................ 427/44, 54.1, 362; 156/245

[56] References Cited

U.S. PATENT DOCUMENTS

| | | | |
|---|---|---|---|
| 2,316,202 | 4/1943 | Warner | 427/362 |
| 2,912,347 | 11/1959 | Yezek et al. | 427/362 |
| 3,330,688 | 7/1967 | Halsey et al. | 427/362 |
| 3,689,346 | 9/1972 | Rowland | 156/245 |

FOREIGN PATENT DOCUMENTS 576108  5/1959  Canada ................................ 427/362

Primary Examiner—John H. Newsome
Attorney, Agent, or Firm—Bell, Seltzer, Park & Gibson

[57] ABSTRACT

This invention relates to an apparatus and method for producing a flexible sheet material having a predetermined surface characteristic of high quality and definition formed on one side thereof. The apparatus of this invention comprises first and second rotating rolls which are mounted on a generally horizontally extending axis with the peripheral surfaces thereof closely spaced from one another to form a narrow gap corresponding to the desired overall thickness of the composite sheet. The second rotating roll has a peripheral surface of a predetermined texture corresponding to the desired surface characteristic to be produced in the sheet. A base web of predetermined thickness less than the narrow gap is directed onto the peripheral surface of the first roll and is advanced along an arcuate path around the periphery of the first roll and then through the narrow gap between the first and second rolls. The base web, upon passing through the narrow gap, is then directed around the second roll and along a predetermined arcuate path around the periphery thereof. A flowable uncured actinic radiation curable thermosetting resin is directed behind the narrow gap between the first and second rolls and into contact with the exposed surface of the base web so that a coating of the resin is applied to the base web and is carried with the base web through the narrow gap to this position the coating, upon emerging from the gap, beneath the base web and in contact with the peripheral surface of the second roll. Then actinic radiation is directed through the base web and onto the coating to cure and harden the coating while in contact with the pattenered surface of the second roll. The base web is then directed away from the second roll to separate the cured and hardened coating from the roll and thus produce a sheet with a predetermined surface characteristic of high quality and fine definition accurately reproducing the surface texture of the second roll.

19 Claims, 3 Drawing Figures

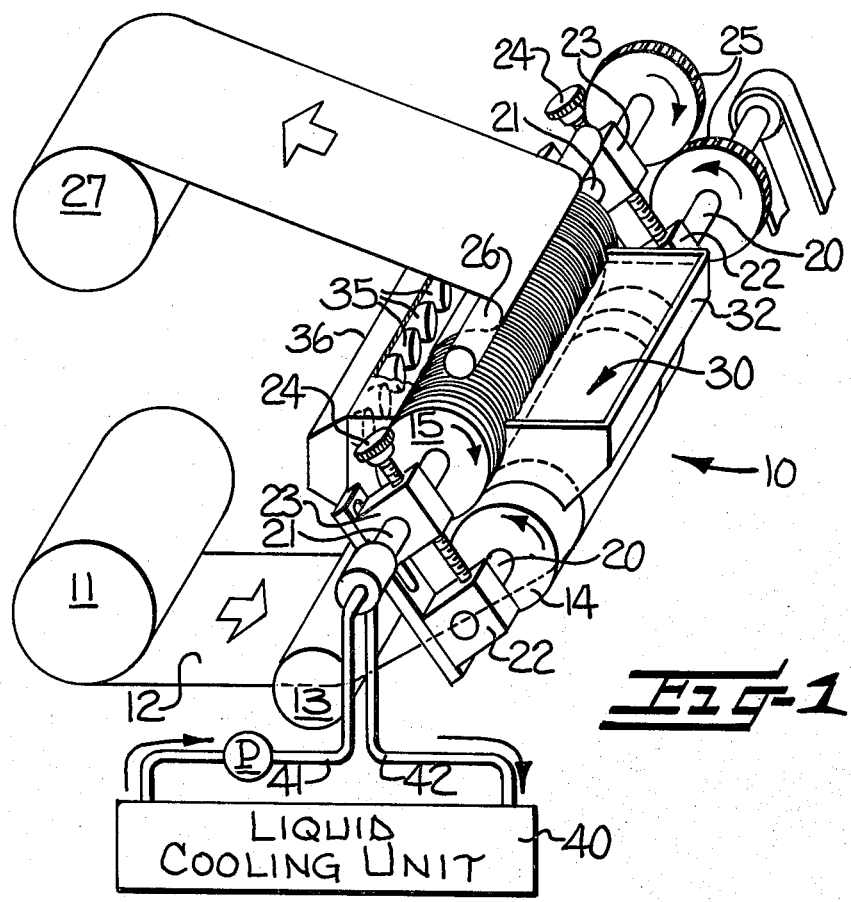
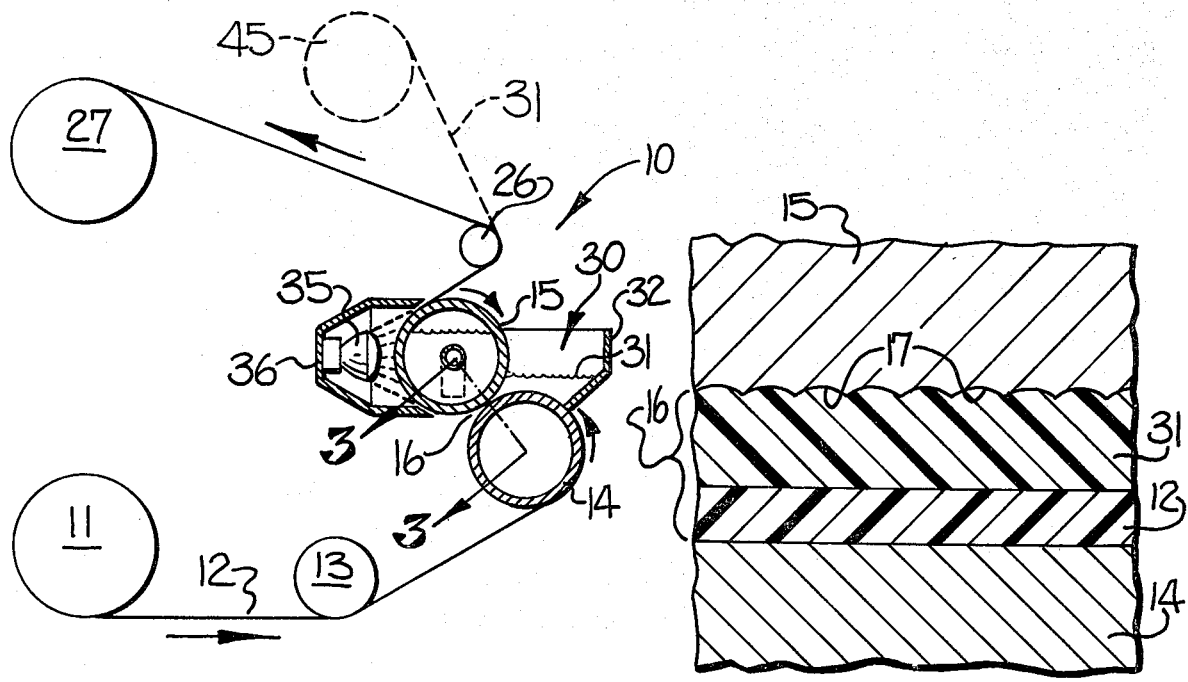

APPARATUS AND METHOD FOR PRODUCING A FLEXIBLE SHEET MATERIAL HAVING A PREDETERMINED SURFACE CHARACTERISTIC

This application is a continuation of application Ser. No. 184,286, filed Sept. 5, 1980 now abandoned.

FIELD OF THE INVENTION

This invention relates to an apparatus and method for producing a flexible sheet material having a predetermined surface characteristic of high quality and definition formed on one side thereof.

BACKGROUND OF THE INVENTION

Commonly owned U.S. Patent application Ser. No. 184,240, filed concurrently with said Ser. No. 184,286, discloses a flexible sheet material having a patterned relief surface of high quality and definition formed on one side thereof. This relief patterned sheet material is of a composite construction and comprises a base film having a layer of a cured thermosetting polymer overlying one surface of the base film and wherein the relief pattern is formed in the thermosetting polymer layer. As noted in the aforementioned co-pending application, this type of sheet material has significant advantages over the relief patterned sheet presently available.

SUMMARY OF THE INVENTION

The present invention relates to an apparatus and method which are particularly well suited for producing a sheet material of the type described in the aforementioned co-pending application. More particularly, the apparatus and method of this invention are capable of continuously producing a sheet material having predetermined surface relief pattern of extremely high quality and fine definition. However, as will become apparent as the description proceeds, the present invention is also useful for forming sheets with other surface characteristics, such as sheets having a polished smooth surface.

The apparatus of the present invention comprises a first cylindrical roll having a relatively smooth peripheral surface and a second cylindrical roll having a peripheral surface with a predetermined texture corresponding to the desired surface characteristic to be produced in the composite sheet. The second roll may, for example, have a relief patterned surface texture for producing various relief patterns in the surface of the sheet material; or if desired, the second roll may have a highly polished surface texture for producing a high quality blemish-free gloss surface without the surface imperfections often found in coatings which are dried or cured in contact with air or gas.

The first and second rolls are rotated at substantially equal peripheral speeds and in opposite directions of rotation. A base web of predetermined thickness is directed onto the peripheral surface of the first roll and over a predetermined arcuate extent therealong. Means is provided for applying to the exposed surface of the base web as it advances along the peripheral surface of the first rotating roll a coating of a flowable uncured thermosetting resin. Means is provided for then directing the base web from the first roll and for guiding the coated surface of the base web onto the textured peripheral surface of the second roll and over a predetermined arcuate path therealong. While the coating of uncured thermosetting resin is in contact with the peripheral surface of the second roll, a curing agent is directed onto the resin to cure and harden the coating. Means is provided for then directing the base web away from the second roll to thereby separate the cured and hardened coating from the peripheral surface of the second roll and thus provide a sheet having a high quality relief surface formed on one side thereof. Optionally, the cured thermosetting coating may then be stripped from the base web.

Preferably, the first and second cylindrical rolls are mounted on parallel horizontally extending and horizontally spaced apart axes with the peripheral surfaces of the rolls spaced apart a predetermined distance to form a narrow gap of predetermined width corresponding to the desired overall thickness of the base sheet. The first and second rolls are rotated at substantially equal peripheral speeds and in opposite directions of rotation such that the peripheral surfaces of both rolls move in a generally downward direction as they pass through the narrow gap. The base web is of a predetermined thickness less than the width of the narrow gap between the two rolls, and the web is directed around the peripheral surface of the first roll, through the narrow gap between the first and second rolls, and then around the peripheral surface of the second roll.

Preferably, the flowable uncured thermosetting resin comprises a solvent-free actinic radiation curable resin material, and means is provided for forming a reservoir of this resin material behind the narrow gap between the first and second rolls so that the base web passes through the reservoir of resin material in its course of travel along the periphery of the first roll and a coating of the flowable uncured resin material is applied to the base film and is carried with the base film through the narrow gap between the first and second rolls. The coating, upon emerging from the gap, is positioned in contact with the peripheral surface of the second roll and beneath the base web as the base web advances along the peripheral surface of the rotating second roll. The curing agent preferably comprises actinic radiation, and the actinic radiation is directed through the base web and thus into contact with the coating of resin located beneath the base web and in contact with the peripheral surface of the second roll. The coating is thus cured and hardened while in contact with the peripheral surface of the second roll and thereby forms an accurate reproduction of the surface texture of the second roll.

The method and apparatus of this invention are particularly advantageous for applying and curing ultraviolet radiation curable thermosetting resins. Normally, the curing of such resins must be carried out under a blanket of nitrogen or other inert gas, since the presence of oxygen during curing will terminate the cure. The necessity of this additional step and its attendant expense are avoided by the present invention since the uncured resin is protectively trapped between the base web and the second roll and thereby isolated from oxygen during the curing stage.

BRIEF DESCRIPTION OF THE DRAWINGS

Some of the features and advantages of the invention having been stated, other features and advantages will become apparent as the description proceeds, when taken in connection with the accompanying drawings, in which FIG. 1 is a schematic perspective view showing the apparatus of this invention;

FIG. 2 is a schematic cross-sectional view of the apparatus; and

FIG. 3 is an enlarged fragmentary cross-sectional view taken substantially along the line 3—3 of FIG. 2 and showing the first and second cylindrical rolls and the composite sheet material being formed in the narrow gap therebetween.

DESCRIPTION OF THE ILLUSTRATED EMBODIMENT

Referring now more particularly to the drawings, an apparatus in accordance with this invention is indicated generally by the reference character 10. As illustrated, apparatus 10 includes a supply roll 11 of a base film 12 and a guide roll 13 located adjacent to the supply roll 11 and having a suitable friction surface, such as a rubber covering, adapted for frictionally engaging the base film 12 and assisting in unrolling the base film from its supply roll.

A pair of cylindrical rolls 14, 15 are mounted in generally horizontally-extending parallel relation to one another, with the peripheral surfaces of the rolls being closely spaced with respect to one another to form a narrow gap 16 of predetermined width. As illustrated, the peripheral surface of the first roll 14 is substantially plain and smooth, while the second roll 15 has a peripheral surface with a predetermined texture corresponding to the desired surface characteristic to be produced in the surface of the composite sheet. In the particular embodiment illustrated herein, the apparatus is intended for producing a relief patterned composite sheet material having a lenticular patterned surface, and the peripheral surface of the second roll 15 has a series of narrow parallel circumferentially extending cavities 17 (FIG. 3) therein of substantially uniform size and shape for producing a series of elongate parallel riblike lenticular formations of narrow width and substantially uniform size and shape in the outer surface of the composite sheet. The narrow circumferentially extending cavities are 17 closely spaced and of a narrow width so as to provide about 100 to 300 of the cavities 17 per inch.

As best seen in FIG. 1, the rolls 14, 15 have respective shafts 20, 21 extending from opposite ends thereof, and the shafts are mounted in respective pillow blocks 22, 23. The pillow blocks 22, 23 are mounted so as to be adjustably positionable with respect to one another by suitable means, such as a threaded shaft 24. By suitable adjustment of the threaded shafts 24, the spacing between the peripheral surfaces of the rolls 14, 15 can be adjusted to thereby control the width of the narrow gap 16, and thus the thickness of the composite sheet which is produced.

Suitable drive means, such as a gear train 25, cooperates with the shafts 20, 21 and serves for rotating the cylindrical rolls 14, 15 at a substantially equal peripheral speed and in opposite directions of rotation, as indicated by the arrows. The horizontally-extending axes of the rolls 14, 15 are laterally offset from one another such that the peripheral surface of each roll moves in a generally downward direction as it passes through the narrow gap 16.

As best seen in FIG. 2, the base film 12 is directed from its supply roll 11 and onto the peripheral surface of the first roll 14 and passes around the peripheral surface of the first roll 14 for a predetermined arcuate extent, then passing through the narrow gap 16 between the first and second rolls. The base film 12 is then directed around the peripheral surface of the second roll 15 for a predetermined arcuate extent, and then separates from the second roll 15 and passes around a reversing roll 26, and thence to a take-up roll 27.

As the base film 12 passes around the peripheral surface of the first roll 14, it advances through a reservoir 30 of a flowable actinic radiation curable resin 31 and a coating of the resin is applied to the exposed surface of the base film 12. Then the base film 12 and the coating of resin 31 pass through the narrow gap 16 between the first and second rolls. The narrow gap 16 serves to meter the coating of resin 31 so as to define a predetermined thickness for the base sheet plus the coating which corresponds to the width of the narrow gap 16. It will be appreciated that while the thickness of the base film may vary to some extent, the thickness of the coating of resin 31 applied to the base film will compensatingly vary so that the overall thickness of the base film 12 plus resin coating 31 is always uniform and corresponds to the predetermined spacing of the narrow gap 16. The reservoir 30 of resin 31 is defined by a series of retaining walls 32 which closely conform to the outer peripheral surface of the first roll. The generally upward movement of the peripheral surface of the first roll, together with the viscosity of the resin prevents any substantial leakage of the resin from the juncture between the retaining walls 32 and the peripheral surface of roll 14.

After passing through the narrow gap 16 between the first and second rolls 14, 15, the coating of resin 31 is thus located in contact with the patterned surface of the second roll 15 and beneath the base film 12. As this assembly advances around the periphery of the second roll 15 with the coating of resin 31 in contact with the patterned relief surface of the roll, the resin 31 is hardened and cured by exposure to a curing agent. Where an actinic radiation curable resin is used, the curing agent may comprise electron beam radiation or ultraviolet light. As illustrated, UV lamps 35 are located closely adjacent the second roll and are oriented toward the second roll for directing ultraviolet light through the base film 12 and into contact with the uncured flowable resin 31 therebelow. Exposure of the coating to the UV radiation causes the resin 31 to cure and harden quickly so that by the time the resin coating is separated from the molding surface it is in a hardened and shape sustaining state and accurately reproduces the pattern of the molding surface in the outer surface of the resin. The protective entrapment of the resin between the base film 12 and the roll 15 keeps the uncured resin out of contact with the oxygen present in the ambient air and thus avoids the necessity of inert gas blanketing of the uncured resin as is conventionally needed in UV curing systems.

As illustrated, the UV lamps are preferably located in a protective housing 36 which fits closely against the periphery of the second roll 15 so as to shield persons in the vicinity of the apparatus from unwanted exposure to the ultraviolet light.

During the operation of the apparatus, the second roll 15 is heated by exposure to the ultraviolet radiation and by heat generated from an exothermic reaction which takes place during the curing of the resin 31. In order to remove the heat from the second roll and maintain the peripheral surface of the second roll at a desirable operating temperature, means is provided for circulating a liquid coolant through the hollow interior of the roll 15. As illustrated, a liquid cooling unit 40 is provided, and supply and return conduits 41, 42 respectively, interconnect the cooling unit with the second roll 15 for circulating the coolant into and through the roll.

The bond strength between the cured resin coating 31 and the base film 12 may be controlled as desired for a particular end use application by suitable selection of the resin composition, base film composition and surface treatment, and use of release additives or adhesion promoters. Thus, the resin coating can be made to adherently and permanently bond to the base film to form a coherent composite sheet material or if desired the cured resin coating may be subsequently stripped free from the base film and may be used either in this form or processed further. The broken line representation in FIG. 2 shows one optional arrangement for stripping the cured resin coating 31 from the base film 12. As illustrated, as the sheet material passes around the reversing roll 26, the cured coating layer 31 is separated from the base film and wound up on a suitable take-up roll 45.

In the drawings and specification there has been set forth a preferred embodiment of the invention and although specific terms are employed, they are used in a generic and descriptive sense only and not for purposes of limitation.

That which is claimed is:

1. An apparatus for producing a flexible sheet material having a predetermined surface characteristic of high quality and fine definition formed on one side thereof, said apparatus comprising
   a first cylindrical roll,
   a second cylindrical roll having a peripheral surface of a predetermined texture corresponding to the desired surface characteristic to be produced in the sheet,
   means for mounting said first and second rolls with the peripheral surfaces thereof spaced apart a predetermined distance to form a fixed narrow gap of predetermined width therebetween,
   means operatively connected to each of said first and second rolls for rotating said first and second rolls at substantially equal peripheral speeds and in opposite direction of rotation,
   means for directing a base web of predetermined thickness less than the width of said fixed narrow gap onto the peripheral surface of said first rotating roll and over a predetermined arcuate path therealong and passing through the fixed narrow gap between said first and second rolls,
   means for applying to the exposed surface of the base web as it advances along the peripheral surface of said first rotating roll a coating of a flowable uncured thermosetting resin,
   means for directing the base web from the first roll and for guiding the coated surface of the base web onto the peripheral surface of said second roll and over a predetermined arcuate path therealong,
   means for curing the coating of uncured thermosetting resin while it is in contact with the peripheral surface of said second roll to cure and harden the coating, and
   means for directing the base web away from said second roll to thereby separate the cured coating from the peripheral surface of said second roll and to thus provide a sheet with a predetermined surface characteristic of high quality and fine definition accurately reproducing the predetermined surface texture of said second roll.

2. An apparatus as set forth in claim 1 wherein said means for curing the resin coating comprises an actinic radiation source located closely adjacent to and oriented toward said second roll for directing actinic radiation through said base web and into contact with the coating of resin therebeneath.

3. An apparatus as set forth in claim 1 wherein the peripheral surface of said second cylindrical roll has a polished smooth texture.

4. An apparatus as set forth in claim 1 wherein the peripheral surface of said second cylindrical roll has a relief patterned texture.

5. An apparatus as set forth in claim 1 wherein the peripheral surface of said second cylindrical roll has a series of narrow parallel cavities therein of substantially uniform size and shape for producing a series of elongate parallel riblike lenticular formations of narrow width, substantially uniform size and shape, and of fine definition and lenslike quality in the outer surface of the sheet.

6. An apparatus as set forth in claim 5 wherein the narrow cavities in the peripheral surface of said second roll are closely spaced about 100 to 300 per inch.

7. An apparatus as set forth in claim 1 additionally comprising means for receiving the sheet after being separated from said second roll and for stripping the base web from the cured coating of thermosetting resin.

8. An apparatus for producing a flexible sheet material having a predetermined surface characteristic of high quality and definition formed on one side thereof, said apparatus comprising
   a first cylindrical roll having a relatively smooth peripheral surface,
   a second cylindrical roll having a peripheral surface of a predetermined texture corresponding to the desired surface characteristic to be produced in the sheet,
   means for mounting said first and second rolls on parallel horizontally extending and horizontally spaced apart axes with the peripheral surface of the rolls spaced apart a predetermined distance to form a fixed narrow gap of predetermined width corresponding to the desired overall thickness of the composite sheet,
   means operatively connected to each of said first and second rolls for rotating said first and second rolls at substantially equal peripheral speeds and in opposite directions of rotation such that the peripheral surfaces of both rolls move in a generally downward direction as they pass through said narrow gap,
   means for directing a base web of predetermined thickness less than the width of said narrow gap along a predetermined path of travel and onto the peripheral surface of said first roll and over a predetermined arcuate path therealong and passing through the narrow gap between said first and second rolls,
   means for directing the base web, upon passing through said narrow gap, onto the peripheral surface of said second roll and over a predetermined arcuate path therealong,
   means for maintaining a flowable solvent-free actinic radiation curable thermosetting resin material behind the narrow gap between said first and second rolls to form a reservoir of the resin through which the base web passes in its course of travel along said predetermined arcuate path in contact with said first roll and through the narrow gap between said first and second rolls so that a coating of the flowable uncured resin material is applied to said base web and is carried with the base web through said narrow gap and whereby the coating, upon emerging from said gap, is positioned in contact with the peripheral surface of said second roll and beneath the base web as the base web passes along said predetermined arcuate path in contact with the peripheral surface of said second roll, means for directing actinic radiation onto the coating of resin located in contact with the peripheral surface of said second roll to thereby cure and harden the radiation curable coating while in contact with the peripheral surface of said second roll, and means for directing the base web away from said second roll to thereby separate the cured coating from the peripheral surface of said second roll and to thus provide a sheet with a predetermined surface characteristic of high quality and fine definition accurately reproducing the predetermined surface texture of said second roll.

9. An apparatus as set forth in claim 8 wherein said means for directing radiation onto the coating of resin comprises a radiation source located adjacent to said second roll and positioned for directing the radiation through the base web and into contact with the radiation curable coating.

10. An apparatus as set forth in claim 8 including means for circulating a coolant through said second roll for cooling the peripheral surface of the roll.

11. An apparatus as set forth in claim 8 wherein said means for mounting said first and second rolls includes means for adjusting the width of the narrow gap between said peripheral surfaces of said rolls.

12. A method for producing a flexible sheet material having a predetermined surface characteristic of high quality and definition formed on one side thereof, said method comprising advancing a base web along a predetermined path of travel while directing one surface of the base web onto the peripheral surface of a first roll and while rotating said roll, advancing the base web along an arcuate path around the periphery of the first rotating roll while applying to the exposed surface of the advancing base web a coating of a flowable uncured thermosetting resin, then directing the advancing base web and the coating of uncured flowable resin thereon from the first roll and guiding the coated surface of the base web onto a second roll spaced apart from the peripheral surface of said first roll a predetermined distance to form a fixed narrow gap therebetween of a width greater than the thickness of said base web, and while rotating said second roll at a peripheral speed substantially equal to that of said first roll, said second roll having a peripheral surface with a predetermined texture corresponding to the desired surface characteristic to be produced in the sheet, advancing the base web along an arcuate path around the periphery of the second roll while maintaining the coating of uncured thermosetting resin in contact with the peripheral surface thereof and while contacting the coating with a curing agent to thereby cure and harden the coating, and directing the base web away from the second roll to thereby separate the cured and hardened coating from the peripheral surface of the second roll and to thus produce a sheet with a predetermined surface characteristic of high quality and fine definition accurately reproducing the predetermined surface texture of said second roll.

13. A method according to claim 12 wherein the uncured thermosetting resin comprises an actinic radiation curable resin and wherein the step of exposing the coating to a curing agent comprises directing actinic radiation into contact with the resin.

14. A method as set forth in claim 12 wherein said first and second rolls are arranged on parallel horizontally extending axes with the peripheral surfaces of the rolls spaced apart a predetermined distance to form a narrow gap corresponding to the desired overall thickness of the composite sheet, and wherein the step of advancing the base web along an arcuate path around the first roll comprises advancing the web around the first roll and then through the narrow gap between said first and second rolls.

15. A method as set forth in claim 14 wherein the step of applying a coating of a flowable uncured thermosetting resin to the advancing base web comprises directing a supply of the resin behind the narrow gap between said first and second rolls and forming a reservoir of the resin through which the base web passes in its course of travel around the first roll and though the gap between said first and second rolls.

16. A method as set forth in claim 14 wherein the base web comprises a release web, and comprising the further step of receiving the sheet upon being separated from said second roll and stripping the base web from the cured coating of thermosetting resin.

17. A method for producing a flexible sheet material having a predetermined surface characteristic of high quality and definition formed on one side thereof, said method comprising advancing a base web of predetermined thickness along a predetermined path of travel while directing one surface of the base web onto the peripheral surface of a first roll mounted on a horizontally extending axis adjacent to a second roll having a peripheral surface of a predetermined texture corresponding to the desired surface characteristic to be produced in the composite sheet and with the peripheral surfaces of the first and second rolls spaced apart a predetermined distance to form a fixed narrow gap corresponding to the desired overall thickness of the composite sheet, rotating said first and second rolls at substantially equal peripheral speeds while advancing the base web along an arcuate path around the periphery of the first roll and directing the web through the fixed narrow gap between said first and second rolls, then directing the base web, upon passing through the fixed narrow gap, onto said second roll and along a predetermined arcuate path around the periphery thereof, and while directing a flowable uncured actinic radiation curable thermosetting resin behind the narrow gap between said first and second rolls and into contact with the exposed surface the base web as it advances around the periphery of said first roll so that a coating of the resin is applied to the base web and is carried with the base web through said narrow gap to thus position the coating, upon emerging from said gap, beneath the base web and in contact with the peripheral surface of said second roll as the base web passes along said predetermined arcuate path around the periphery of said second roll, directing actinic radiation onto the coating of resin located in contact with the peripheral surface of said second roll to thereby cure and harden the coating while in contact with the surface of said second roll, and directing the base film away from said second roll to thereby separate the cured and hardened coating from the peripheral surface of the second roll and to thus provide a sheet with a predetermined surface characteristic of high quality and fine definition accurately reproducing the predetermined surface texture of said second roll.

18. A method as set forth in claim 17 wherein the actinic radiation curable resin comprises a UV curable resin, and wherein the step of directing actinic radiation onto the coating of resin comprises directing ultraviolet light toward said second roll and through the base film and into contact with the coating of resin therebeneath.

19. A method as set forth in claim 17 including the step of circulating a coolant through said second roll so as to cool the patterned peripheral surface thereof.

* * * * *